(12) United States Patent
Zarudniev et al.

(10) Patent No.: US 12,123,934 B2
(45) Date of Patent: Oct. 22, 2024

(54) RADAR DETECTION DEVICE

(71) Applicant: COMMISSARIAT A L'ENERGIE ATOMIQUE ET AUX ENERGIES ALTERNATIVES, Paris (FR)

(72) Inventors: Mykhailo Zarudniev, Grenoble (FR); Cédric Dehos, Grenoble (FR); Alexandre Siligaris, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 521 days.

(21) Appl. No.: 17/456,452

(22) Filed: Nov. 24, 2021

(65) Prior Publication Data

US 2022/0163648 A1 May 26, 2022

(30) Foreign Application Priority Data

Nov. 26, 2020 (FR) ..................................... 20 12198

(51) Int. Cl.
*G01S 13/02* (2006.01)
*G01S 13/34* (2006.01)

(52) U.S. Cl.
CPC ........ *G01S 13/0209* (2013.01); *G01S 13/343* (2013.01)

(58) Field of Classification Search
CPC .... G01S 7/032; G01S 13/0209; G01S 7/2883; G01S 7/285; G01S 7/352; G01S 13/24;
(Continued)

(56) References Cited

U.S. PATENT DOCUMENTS 5,107,272 A * 4/1992 Joynson .................. G01S 7/282
331/22
11,029,388 B2 * 6/2021 Melzer .................. G01S 7/4017
(Continued)

OTHER PUBLICATIONS

Lai et al., "Finger Gesture Sensing and Recognition Using a Wi-Fi-based Passive Radar", 2019 IEEE MTT-S International Microwave Symposium (IMS), IEEE, Jun. 2, 2019, 4 pages.
(Continued)

*Primary Examiner* — Peter M Bythrow
(74) *Attorney, Agent, or Firm* — Oblon, McClelland, Maier & Neustadt, L.L.P.

(57) ABSTRACT

A radar measuring device including at least:
 a circuit for generating a radar signal $RF_{IN}(t)$;
 an emitting antenna;
 an injection-locked oscillator;
 a first power divider comprising an input coupled to an output of the circuit for generating the radar signal $RF_{IN}(t)$, a first output coupled to the emitting antenna, and a second output to an input of the injection-locked oscillator which is configured to be locked over a portion of an effective band B of the radar signal $RF_{IN}(t)$;
 a receiving antenna intended to receive a reflected radar signal $RF_{IN\_REFL}(t)$;
 a mixer comprising a first input coupled to the receiving antenna, a second input coupled to an output of the injection-locked oscillator, and an output coupled to an input to a signal processing circuit.

16 Claims, 13 Drawing Sheets

(58) Field of Classification Search
CPC ........ G01S 13/26; G01S 13/30; G01S 13/343;
G01S 13/931
See application file for complete search history.

(56) References Cited

U.S. PATENT DOCUMENTS

| | | | |
|---|---|---|---|
| 2016/0187475 A1* | 6/2016 | Horng | G01S 13/88 |
| | | | 342/21 |
| 2019/0319581 A1* | 10/2019 | Chen | H03F 1/32 |
| 2021/0109208 A1* | 4/2021 | Horng | A61B 5/7225 |
| 2021/0341595 A1* | 11/2021 | Yu | G01S 13/536 |
| 2021/0356560 A1* | 11/2021 | Wang | G01S 13/88 |

OTHER PUBLICATIONS

IEEE document entitled: "IEEE Standard for Radar Definitions", IEEE Std 686TM-2017, 2017, 54 pages.
Siligaris et al, "A 60 GHz UWB Impulse Radio Transmitter with Integrated Antenna in CMOS65nm SOI Technology", Silicon Monolithic Integrated Circuits in RF Systems (SiRF), 2011, 4 pages.
French Preliminary Search Report Issued Aug. 11, 2021 in French Application 20 12198 filed on Nov. 26, 2020(with English Translation of Categories of Cited Documents), 2 pages.
U.S. Appl. No. 17/406,265, filed Aug. 19, 2021, Zarudniev, et al.

* cited by examiner

RADAR DETECTION DEVICE

TECHNICAL FIELD

This document relates to the field of so-called "wideband" radar measuring device, i.e. using radar signals having effective frequency bands with a width greater than or equal to 1 GHz, making it possible to measure one or more distances between the radar measuring device and one or more reflectors.

It concerns in particular to the field of Short Range Radar measurement, and which corresponds to measurement performed for distance for example shorter than a few kilometres, or shorter than 100 m or 10 m, used in particular in the automotive field (for example for ACC radars, standing for "Adaptive Cruise Control"), in that of surveillance and defence, in the aeronautic industry, for gesture recognition via distance measurements and reconstruction of movements detected from measured distances, or making of human-machine interfaces, or the field of measurement and surveillance of vital signs (heart rate and respiration), etc.

PRIOR ART

So-called coherent radar measuring devices, i.e. which measure the information contained in a received radar signal based on (frequency and/or time) phase-shifts with respect to the emitted radar signal, require knowing and mastering the parameters of the emitted radar signal. The most important parameter to know is the start time point of the signal in emission, without which it is very difficult to acquire the signal in reception and recover the measurement spatial information following this acquisition.

Two groups of architectures of such radar measuring devices allow emitting and receiving the two main types of modulation of a radar signal: FMCW ("Frequency Modulated Continuous Wave") and IR-UWB ("Ultra Wide Band Impulse Radio").

An advantage of FMCW type devices in comparison with the IR-UWB type ones is that the sampling frequency used during the analog-to-digital conversion of the received radar signal and necessary to comply with Nyquist-Shannon's theorem is much lower than that necessary in IR-UWB type devices. A low sampling frequency allows limiting the cost and the consumption of the analog-to-digital converters and of the digital processing circuit(s) of the signal used in the radar device. Moreover, this low sampling frequency allows reducing the acquisition band of the device, which allows reducing the noise on the radar output voltage and promotes the obtained signal-to-noise ratio (SNR).

Conversely, a FMCW type device is considerably constrained by the durations of emission and reception of the radar signals imposed thereon because of the characteristics of the used radar signals. An IR-UWB type device does not have this constraint since the effective band of the radar signal is inversely proportional to this emission or reception duration. An advantage conferred by a short duration of emission and reception of radar signals is that all or part of the electronics of the radar device could be shut off or operate in a degraded mode between the emission or the reception of two radar signals (an operating mode commonly called "duty cycling"), which allows reducing the overall energy consumption of the radar device.

The effective band B of a radar signal is defined by the IEEE in the document "IEEE Standard for Radar Definitions", IEEE Std 686-2017, 2017, pp 1-54 and corresponds to the ratio between the variance of the energy of the radar signal and the energy of this signal such that:

$$B = \frac{\int_{-\infty}^{+\infty} (2\pi(f - f_0))^2 |\mathcal{F}[s](f)|^2 df}{\int_{-\infty}^{+\infty} |\mathcal{F}[s](f)|^2 df}$$

where $s(t)$ corresponds to the received radar signal, $\mathcal{F}[s]$ corresponds to the Fourier transform of the received radar signal, and $f_0$ corresponds to the central frequency of the spectrum of the radar signal.

The effective band B of the used radar signal determines to a large extent the capacity of the radar device to be able to separate and distinguish two close reflectors, and therefore represents the resolution that could be reached by the radar device. Hence, having the widest possible effective band B is also an objective that is pursued in general.

DISCLOSURE OF THE INVENTION

Thus there is a need to provide a new architecture of a radar measuring device enabling a measure one or more distances between the radar measuring device and one or more reflectors while obtaining of a good trade-off between the different parameters disclosed hereinabove, namely the possibility of having a low sampling frequency for the analog-to-digital conversion of the received radar signals, a short duration of emission and reception of radar signals and an effective band of the radar signals that is wide.

For this purpose, one embodiment provides a radar measuring device including at least:
- a circuit for generating a radar signal $RF_{IN}(t)$;
- an emitting antenna;
- an injection-locked oscillator, or ILO ("Injection Locked Oscillator");
- a first power divider comprising an input coupled to an output of the circuit for generating the radar signal $RF_{IN}(t)$, a first output coupled to the emitting antenna, and a second output coupled to an input of the injection-locked oscillator which is configured to be locked over a portion of an effective band B of the radar signal $RF_{IN}(t)$;
- a receiving antenna intended to receive a reflected radar signal $RF_{IN\_REFL}(t)$;
- a mixer comprising a first input coupled to the receiving antenna, a second input coupled to an output of the injection-locked oscillator, and an output coupled to an input to a signal processing circuit.

In addition, the signal processing circuit is configured to provide a signal which is representative of a distance between the receiving antenna and at least one reflector onto which the radar signal $RF_{IN}(t)$ is reflected.

In this radar measuring device, the radar signal $RF_{IN}(t)$ is divided before the emission thereof via the first power divider and part of the power of this signal is used to power and lock an ILO. The ILO having a natural oscillation frequency that could be configured, or reconfigured, for example through the adjustment of a control voltage applied at the input thereof and/or a modification of the value of a bank of switched capacitances of a LC resonator of the ILO, the latter is driven so that it is locked over a portion of the effective band B of the radar signal $RF_{IN}(t)$. The ILO replicates the radar signal $RF_{IN}(t)$ only in its natural locking band which is defined by the properties of its resonator and/or the control voltage applied on its input, and which corresponds to a portion of the effective band B of the radar signal $RF_{IN}(t)$. The ILO ensures a function analog to that of a configurable RF filter allowing selecting a measurement band. Afterwards, the signal delivered at the output of the ILO is sent at the input of the mixer in order to ensure a frequency transposition of the reflected radar signal $RF_{IN\_REFL}(t)$.

The total duration required by the emitted signal to reach a reflector ("scatter"), be reflected on the latter and reach the receiving antenna of the radar device is reflected by a time translation proportional to the sum of the distances that this signal has travelled, and becomes the received signal. In other words, this duration is reflected by a delay on the frequency ramp formed by the spectrum of the received signal, and this offset between the frequency ramp formed by the spectrum of the emitted signal and that formed by the spectrum of the received signal is reflected by a frequency difference. After having been mixed with the output signal of the ILO, this received signal becomes a low-frequency signal from which the information on the distance and relative velocity of the reflector opposite the radar measuring device are recovered after the processing applied by the signal processing circuit.

Thanks to the use of the ILO to perform the link between the emission portion and the reception portion of the radar measuring device, the coherence between the emitted and received radar signals is preserved in the measuring band. The time of locking of the ILO on the radar signal $RF_{IN}(t)$ being almost instantaneous (in the range of a few nanoseconds), the frequency variations of the signal $RF_{IN}(t)$ could be very quick and the radar signal $RF_{IN}(t)$ could have a low duty cycle, i.e. could have a zero value over a large portion of each period of the signal. Thanks to the short emission and reception duration required to this radar device, it is therefore possible to achieve energy savings by making the emission and reception portions of the radar measuring device operate such that they are shut off or they operate in a degraded mode between two emissions/receptions of radar signals.

Furthermore, with this radar measuring device, the sampling frequency used during an analog-to-digital conversion of the reflected radar signal could be lower than with the measuring devices of the prior art, and for example comprised between 100 MHz and 300 MHz.

Finally, the presence of the ILO in the radar measuring device allows guaranteeing at any time the reception of the periodic radar signal with a non-zero amplitude and of a "duty cycle" type, on the receiver side of the radar measuring device.

The circuit for generating the radar signal $RF_{IN}(t)$ may be configured to generate the radar signal $RF_{IN}(t)$ corresponding to:
 a frequency-modulated periodic signal over at least one portion $L_{rampe}$ of a period T of said signal, corresponding, over said at least one portion $T_{rampe}$ of the period T, to a sinusoidal signal whose frequency varies linearly in the effective band B and whose amplitude alternates between a first value and a second value different from the first value, or
 a train of pulses whose frequency modulation is defined by the time position of the beginning of each pulse, by the relative phase-shift of the signal at the beginning of each pulse and by the width of each pulse.

When the radar signal $RF_{IN}(t)$ corresponds to a pulse train as described hereinabove, the radar measuring device then has the advantage that, in comparison with the conventional FMCW or IR-UWB type radar signals, the effective band B that could be scanned by the radar signal $RF_{IN}(t)$ is wider and/or, for a given effective band B, the duration required to scan this band is shorter.

The radar signal $RF_{IN}(t)$ corresponding to a pulse train may be such that:

$$RF_{IN(t)} = \sum\nolimits_{n=1}^{n_{max}} \prod \left( \frac{t - t_{start}(n) - \frac{T(n)}{4}}{\frac{T(n)}{2}} \right) \cdot e^{j2\pi f_a(t - t_{start}(n))}$$

with:
$f_a$ corresponding to the frequency of the carrier of the signal $RF_{IN}(t)$;

$T(n) = t_{start}(n+1) - t_{start}(n)$, and which corresponds to the duration of a $n^{th}$ pulse of the radar signal $RF_{IN}(t)$;

$$t_{start}(n) = \frac{f'_{in} T_{rampe}}{B_{in}} \left( -1 + \sqrt{1 + \frac{2 B_{in}}{f'^2_{in} T_{rampe}} (n-1)} \right), n \in \{1, \ldots, n_{max}\}$$

and which corresponds to the starting time of each $n^{th}$ pulse of the radar signal radar $RF_{IN}(t)$;
$f_{in}'$ corresponding to the fundamental frequency of the modulating signal when $n=1$;
$n_{max}$ corresponding to the number of pulses in the radar signal $RF_{IN}(t)$ over the effective band B.

The above-described pulse signal may include, or not, a spectral overlap over the duration $T_{rampe}$.

According to a first embodiment, the device may further include a control circuit of the injection-locked oscillator configured to modify, at each period of the radar signal $RF_{IN}(t)$, the locking frequency band of the injection-locked oscillator such that, over several successive periods of the radar signal $RF_{IN}(t)$, the locking frequency bands of the injection-locked oscillator cover, together, the effective band B. An advantage of this first embodiment consists in requiring only one single ILO, one single power divider and one single mixer, which minimises the electric consumption of the radar measuring device.

The signal processing circuit may be configured to implement:
 a band-pass filtering of the signal delivered at the output of the mixer, then
 an analog-to-digital conversion of the signal obtained after the implementation of the band-pass filtering, then
 a processing of the signal obtained after the implementation of the analog-to-digital conversion, keeping only portions of this signal during which the injection-locked oscillator is locked over a portion of the effective band B, then
 a discrete Fourier transform of the signal obtained after the implementation of the processing keeping only portions of the signal during which the injection-locked oscillator is locked over a portion of the effective band B.

The signal obtained after having implemented the discrete Fourier transform is representative of the distance between the receiving antenna and the reflector(s) on which the radar signal $RF_{IN}(t)$ has been reflected, and could include in particular one or several amplitude peak(s) representative of this or these reflector(s).

According to another embodiment, the radar measuring device may include:
- several injection-locked oscillators;
- several first power dividers configured to apply the radar signal $RF_{IN}(t)$ on the emitting antenna and on an input of each of the injection-locked oscillators;
- several mixers each comprising a second input coupled to an output of one of the injection-locked oscillators and an output coupled to an input of the signal processing circuit;
- one or several second power divider(s) configured to apply the reflected radar signal $RF_{IN\_REFL}(t)$ on a first input of each of the mixers.

In this other embodiment, the radar signal $RF_{IN}(t)$ is applied at the input of each ILO in an independent manner. The outputs of each ILO replicate the emitted radar signal $RF_{IN}(t)$ only in the locking frequency ban specific to each ILO (and defined by the properties of the resonator of the ILO and of the value of the control voltage applied thereon). Hence, each ILO filters the radar signal $RF_{IN}(t)$ in its locking frequency band. Afterwards, after having mixed the output signal of each ILO with the reflected radar signal $RF_{IN\_REFL}(t)$ and thus frequency transposed the reflected radar signal $RF_{IN\_REFL}(t)$ in the locking frequency band of each ILO, low-frequency signals are obtained from which information on the distance and relative velocity of the reflector(s) opposite the radar measuring device are obtained. Thus, considering the reception of several frequency bands by different ILOs allows using a radar signal $RF_{IN}(t)$ whose effective band B is larger while keeping a shorter reception duration.

In this other embodiment, when the radar signal $RF_{IN}(t)$ corresponds to the pulse signal previously described hereinabove and includes a spectral overlap over the duration $T_{rampe}$, it is possible to use each ILO so as to maximise its locking time over a ramp duration $T_{rampe}$.

In this other embodiment, the signal processing circuit may be configured to implement:
- a band-pass filtering of each of the signals delivered at the output of the mixers, then
- an analog-to-digital conversion of each of the signals obtained after the implementation of the filtering, then
- a processing of the signals obtained after the implementation of the analog-to-digital conversion, keeping only portions of each of these signals during which each of the injection-locked oscillators is locked over a portion of the effective band B, then
- a discrete Fourier transform of a signal obtained after the implementation of the processing keeping only portions of each of the signals during which each of the injection-locked oscillators is locked over a portion of the effective band B.

The signal obtained at the output of the discrete Fourier transform is representative of the distance between the receiving antenna and the reflector(s) on which the radar signal $RF_{IN}(t)$ has been reflected, and could include in particular one or several amplitude peak(s) representative of this or these reflector(s).

In a first configuration of this other embodiment, each of the injection-locked oscillators may be configured such that its locking frequency band is different from that of the other injection-locked oscillators and that the locking frequency bands of the injection-locked oscillators cover, together, the effective band B. In this first configuration, each of the ILOs is configured to be successively locked over a portion, or sub-band, of the effective band B.

In a second configuration of this other embodiment, the radar measuring device may further include a control circuit of each of the injection-locked oscillators configured to modify, at each period of the radar signal $RF_{IN}(t)$, the locking frequency band of each of the injection-locked oscillators such that, over several periods of the radar signal $RF_{IN}(t)$, the locking frequency bands of the injection-locked oscillators include, together, the effective band B.

In this second configuration, the ILOs may be configured to be successively or simultaneously locked over different portions of the effective band B.

In the case where the radar measuring device includes the control circuit:
- the control circuit may be configured to apply, at the input of the injection-locked oscillator or of each of the injection-locked oscillators, a control voltage whose value determines a central frequency $f_c$ of a locking frequency band of the injection-locked oscillator or of each of the injection-locked oscillators, and/or
- the control circuit may be configured to modify the values of switched capacitances of at least one resonator in the injection-locked oscillator or in each of the injection-locked oscillators.

The radar measuring device may further include at least one power amplifier disposed between the emitting antenna and the first power divider(s).

The radar measuring device may further include at least one low-noise amplifier interposed between the receiving antenna and the mixer or, when the radar measuring device includes several second power dividers, between the receiving antenna and the second power dividers.

The signal processing circuit may be configured to carry out a compensation of a phase-shift between the radar signal $RF_{IN}(t)$ and the signal(s) delivered at the output of the injection-locked oscillator(s).

In this case, the radar measuring device may further include a controllable feedback circuit configured, in a configuration of measuring the phase-shift between the radar signal $RF_{IN}(t)$ and the signal(s) delivered at the output of the injection-locked oscillator(s), to directly connect the first output of the first power divider of one of the first power dividers to the first input of the mixer or of each of the mixers, and the signal processing signal may be configured to perform a measurement of the phase-shift between the radar signal $RF_{IN}(t)$ and the or each of the signals delivered at the output of the injection-locked oscillator(s), then the phase-shift compensation using the previously performed phase-shift measurement(s). Such a feedback circuit enables the radar measuring device to form a BIST-type circuit, or commonly called "Built-In Self-Test".

Alternatively, it is possible that the radar measuring device does not include such a feedback circuit and that the phase-shift between the radar signal $RF_{IN}(t)$ and the or each of the signals delivered at the output of the injection-locked oscillator(s) is measured differently during a phase of calibrating the device, for example through a programmable delay cell coupled to the input or the output of the ILO(s) or by implementing a measurement from a reflector disposed at a known distance from the device.

BRIEF DESCRIPTION OF THE DRAWINGS

The present invention will be better understood upon reading the description of embodiments provided for purely indicative and non-limiting purposes with reference to the appended drawings wherein.

Identical, similar or equivalent portions of the different figures described hereinafter bear the same reference numerals so as to facilitate switching from one figure to another.

The different portions shown in the figures are not necessarily according to a uniform scale, to make the figures more readable.

The different possibilities (variants and embodiments) should not be understood as exclusive of each other and could be combined together.

DETAILED DISCLOSURE OF PARTICULAR EMBODIMENTS

A radar measuring device 100 according to a first embodiment is described hereinbelow in connection with FIG. 1.

The device 100 includes a circuit 102 for generating a radar signal $RF_{IN}(t)$.

According to a first embodiment, the radar signal $RF_{IN}(t)$ generated by the circuit 102 corresponds to a signal with a train of pulses coherently modulated. An example of such a pulse signal is shown, in the time domain, in FIG. 2, and is expressed by the following relationship:

$$RF_{IN(t)} = \sum_{n=1}^{n_{max}} \prod \left( \frac{t - t_{start}(n) - \frac{T(n)}{4}}{\frac{T(n)}{2}} \right) \cdot e^{j2\pi f_a(t - t_{start}(n))},$$

$$n \in \{1, \ldots, n_{max}\}$$

In the equation hereinabove:

$n_{max}$ corresponds to the number of pulses of the radar signal $RF_{IN}(t)$ for the instantaneous frequency of the signal $RF_{IN}(t)$ to vary over the entire effective band B of the radar signal $RF_{IN}(t)$;

$t_{start}(n)$ corresponds to the start time point of an $n^{th}$ pulse of the signal $RF_{IN}(t)$;

$f_a$ corresponds to the frequency of the carrier of the radar signal $RF_{IN}(t)$;

$T(n)$ corresponds to the duration of an $n^{th}$ pulse of the radar signal $RF_{IN}(t)$.

The parameter $t_{start}(n)$ is expressed by the following relationship:

$$t_{start}(n) = \frac{f'_{in}T_{rampe}}{B_{in}}\left(-1 + \sqrt{1 + \frac{2B_{in}}{f'^2_{in}T_{rampe}}(n-1)}\right), n \in \{1, \ldots, n_{max}\}$$

In the equation hereinabove, $f_{in}'$ corresponds to the fundamental frequency of the beginning of the ramp, i.e. when n=1, of the low-band signal or modulating signal, and $T_{rampe}$ corresponds to the duration with which the instantaneous frequency of the signal $RF_{IN}(t)$ varies over the entire effective band B. The value of $f_{in}'$ is equal to $1/T(1)$.

The parameter $T(n)$ is expressed by the following relationship:

$$T(n) = t_{start}(n+1) - t_{start}(n), n \notin \{1, \ldots, n_{max}\}$$

Figure 2:
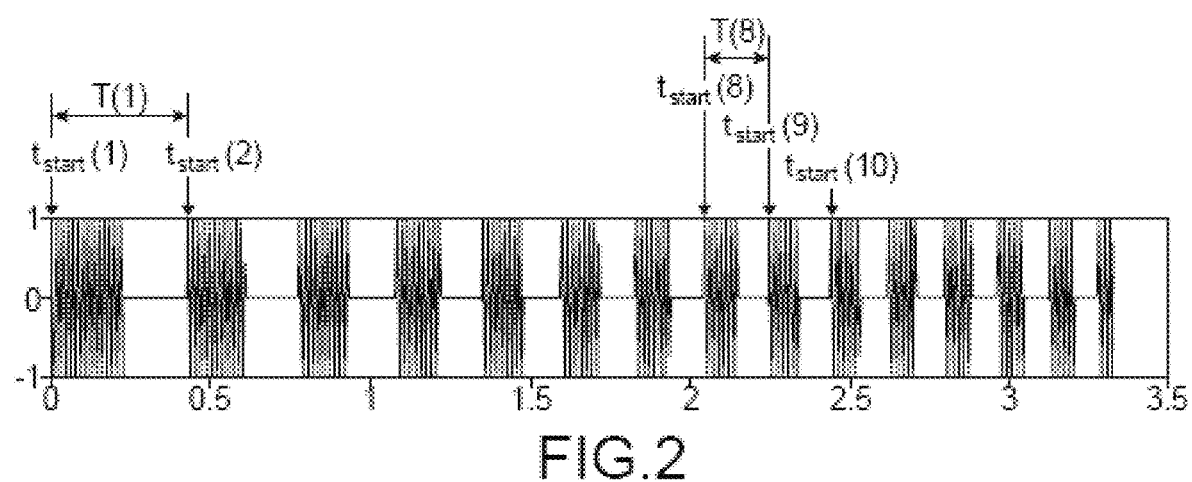
FIG. 2 shows a first example of a radar signal $RF_{IN}(t)$ generated in a radar measuring device.

In FIG. 2, examples of $T(n)$ and $t_{start}(n)$ for different values of n are shown. In addition, in the example of FIG. 2, $n_{max}=15$.

$$f'_{in} < \frac{B.f_a}{f'_{in}},$$

Figure 3:
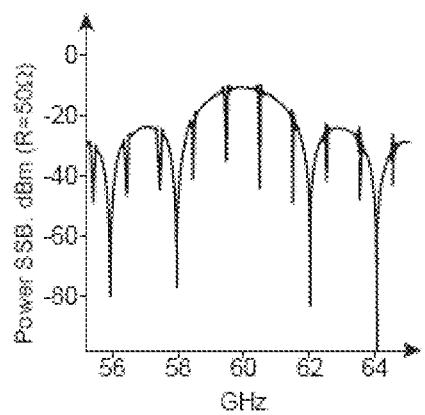
FIG. 3 shows the spectrum of the first example of the radar signal $RF_{IN}(t)$ when the latter is of the pulse-type and does not include any spectral overlap.
Figure 4:
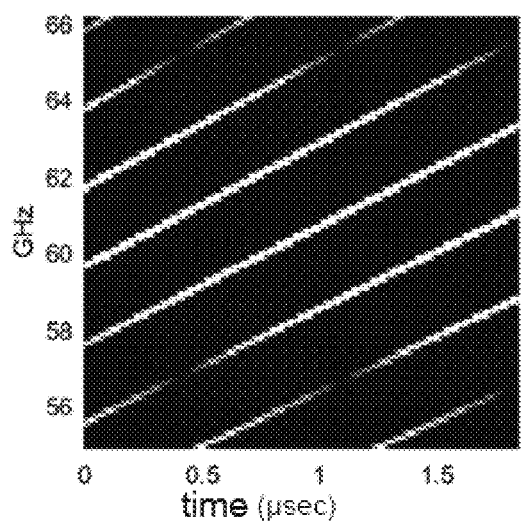
FIG. 4 shows the evolution in the time domain of the instantaneous frequency of the first example of the radar signal $RF_{IN}(t)$ when the latter is of the pulse-type and does not include any spectral overlap.

When the signal $RF_{IN}(t)$ is such that it does not includes any spectral overlap over the duration $T_{rampe}$. The spectrum of such a signal $RF_{IN}(t)$, with $f_a=60$ GHZ, is shown in FIG. 3, and the evolution in the time domain of the instantaneous frequency of this signal $RF_{IN}(t)$, over a duration equal to $T_{rampe}$, is shown in FIG. 4. In this case, the radar signal $RF_{IN}(t)$ corresponds to an alternating multi-band signal, i.e. it will simultaneously cover, throughout the duration $T_{rampe}$, several frequency bands whose values does not overlap, or do not straddle on each other, and which define the effective band B of the radar signal $RF_{IN}(t)$.

$$f'_{in} \geq \frac{B.f_a}{f'_{in}},$$

Figure 5:
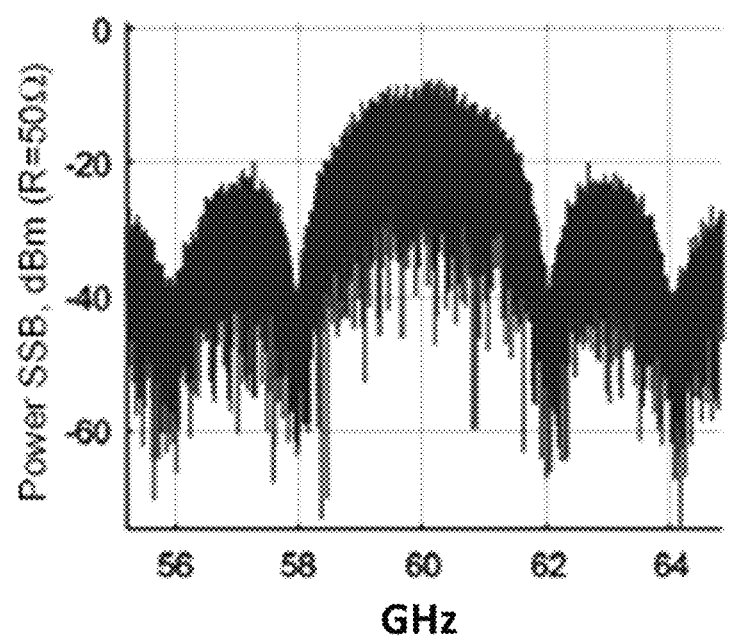
FIG. 5 shows the spectrum of the first example of the radar signal $RF_{IN}(t)$ when the latter is of the pulse-type and includes a spectral overlap.
Figure 6:
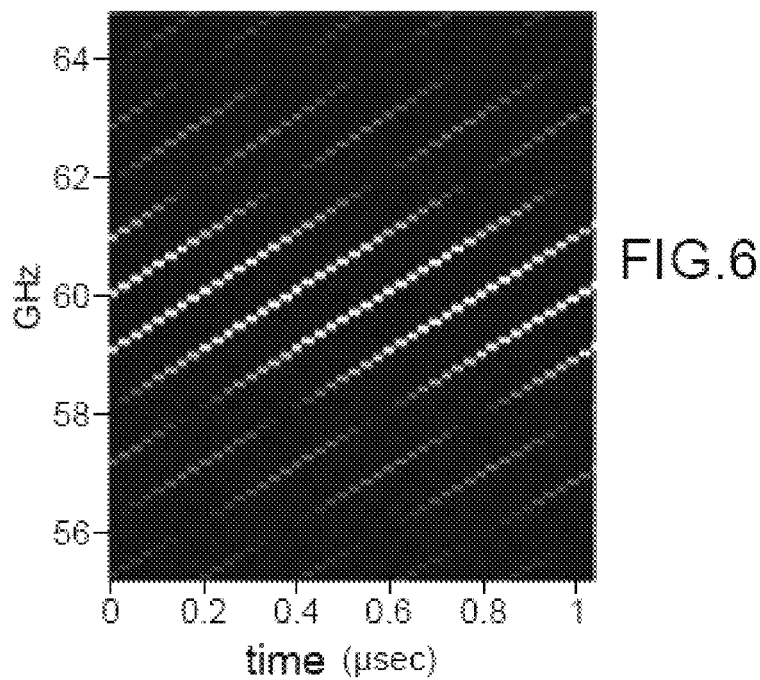
FIG. 6 shows the evolution in the time domain of the instantaneous frequency of the first example of the radar signal $RF_{IN}(t)$ when the latter is of the pulse-type and includes a spectral overlap.

Conversely, when the signal $RF_{IN}(t)$ is such that it includes a spectral overlap over the duration $T_{rampe}$. The spectrum of such a signal $RF_{IN}(t)$ is shown in FIG. 5, and the evolution in the time domain of the instantaneous frequency of this signal $RF_{IN}(t)$, over a duration equal to $T_{rampe}$, is shown in FIG. 6. In this case, the radar signal $RF_{IN}(t)$ corresponds to a simultaneous multi-band signal, i.e. it will simultaneously cover, throughout the duration $T_{rampe}$, several frequency bands whose values overlap, or straddle on each other, and which define the effective band B of the radar signal $RF_{IN}(t)$.

According to a second embodiment, the radar signal $RF_{IN}(t)$ generated by the circuit 102 corresponds to a FMCW-type radar signal, i.e. a frequency-modulated periodic signal over at least one portion $T_{rampe}$ of a period T, corresponding, over said at least one portion $T_{rampe}$ of the period T, to a sinusoidal signal whose frequency varies linearly in the effective band B and whose amplitude alternates between a first value and a second value different from the first value. In contrast with the previously-described first embodiment, the radar signal $RF_{IN}(t)$ according to the second embodiment corresponds to a single-band signal, i.e. it will cover, throughout the duration $T_{rampe}$, one single frequency band that corresponds to its effective band B.

Figure 7:
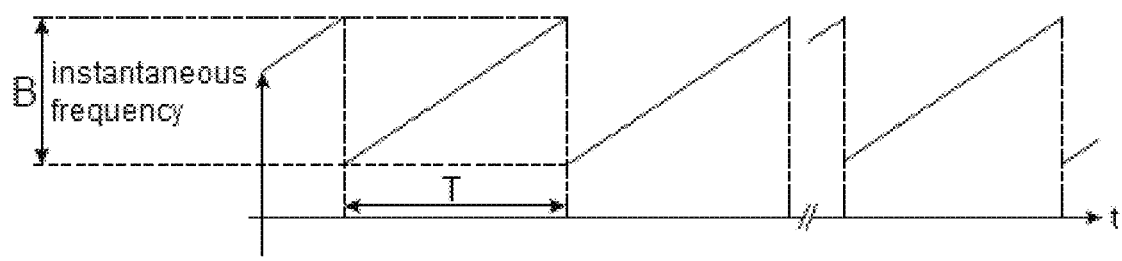
FIGS. 7 and 8 show, each, the evolution in the time domain of the instantaneous frequency of a second example of a FMCW-type radar signal $RF_{IN}(t)$ generated in the radar measuring device.
Figure 8:
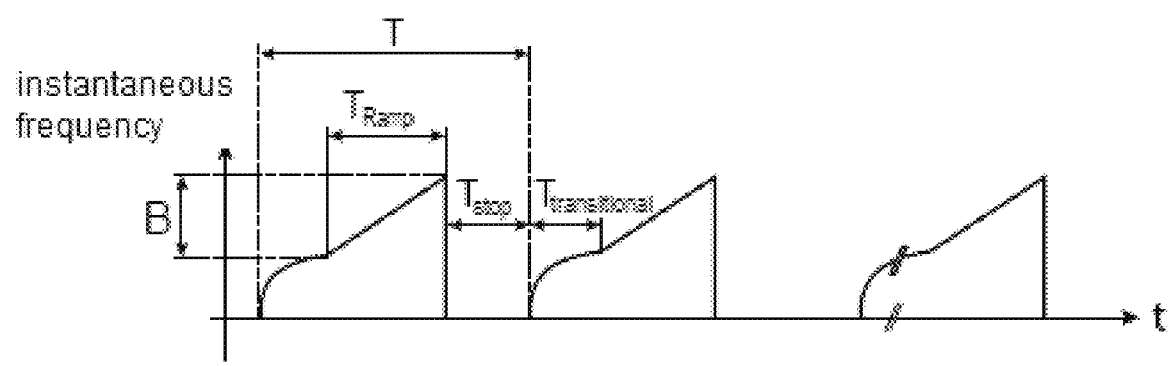
Figure 9:
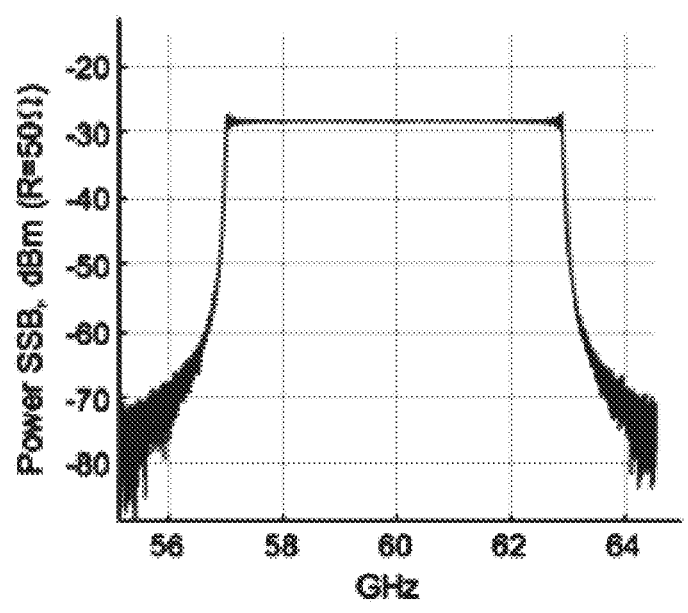
FIG. 9 shows the spectrum of the second example of the radar signal $RF_{IN}(t)$.

The evolution in the time domain of the instantaneous frequency of this second embodiment of the signal $RF_{IN}(t)$ is shown, in FIG. 7 when $T=T_{rampe}$, and in FIG. 8 when $T \neq T_{rampe}$. The spectrum of such a signal $RF_{IN}(t)$ is shown in FIG. 9.

The radar signal $RF_{IN}(t)$ according to this second embodiment may be expressed by the following relationship:

$$RF_{IN(t)} = \sin(2\pi f'_c t + 2\pi \alpha t^2) \text{ Å} t \notin [0, T_{rampe}]$$

The slope of the radar signal $RF_{IN}(t)$ is defined by the parameter a representative of the quickness of the frequency excursion of the radar signal over a fixed time. This parameter α is representative of the tangent of the angle formed by the ramp with respect to the time axis, and is expressed in GHz/μs. The higher the value of the parameter α, the quicker the variation of the instantaneous frequency of the signal over the effective band B is obtained (i.e. the shorter T will be) or, for a fixed duration T, the larger the effective band B is. The parameter α is expressed by the relationship $\alpha = B/(2T_{rampe})$.

The frequency $f_c$ of the signal $RF_{IN}(t)$ at the beginning of the ramp is expressed by the relationship $f'_c = f_c - \alpha \cdot T_{rampe}$, with $f_c$ corresponding to the frequency of the carrier of the radar signal $RF_{IN}(t)$.

The radar signal $RF_{IN}(t)$ delivered at the output of the circuit 102 is sent at the input of a power divider 104. A first output of the power divider 104 is coupled to an input of a power amplifier 106 whose output is coupled to an emitting antenna 108. A second output of the power divider 104 is coupled to an input of an injection-locked oscillator, or ILO, 110. For example, the ILO 110 may be made as described in the document "A 60 GHz UWB impulse radio transmitter with integrated antenna in CMOS65nm SOI technology" of A. Siligaris et al., Silicon Monolithic Integrated Circuits in RF Systems (SiRF), 2011 IEEE 11th Topical Meeting on, pp. 153-156, 17-19 Jan. 2011.

The device 100 also includes a receiving antenna 112 intended to receive a reflected radar signal $RF_{IN\_REFL}(t)$ which corresponds to the radar signal $RF_{IN}(t)$ has been emitted by the emitting antenna 108 and reflected on one or several reflector(s). The total duration required by the emitted radar signal $RF_{IN}(t)$ to reach a reflector, be reflected on the latter and reach the receiving antenna 112 is reflected by a time-shift of the signal $RF_{IN\_REFL}(t)$ with respect to the signal $RF_{IN}(t)$ that is proportional to the distance separating the reflector from the receiving antenna 112.

Figure 1:
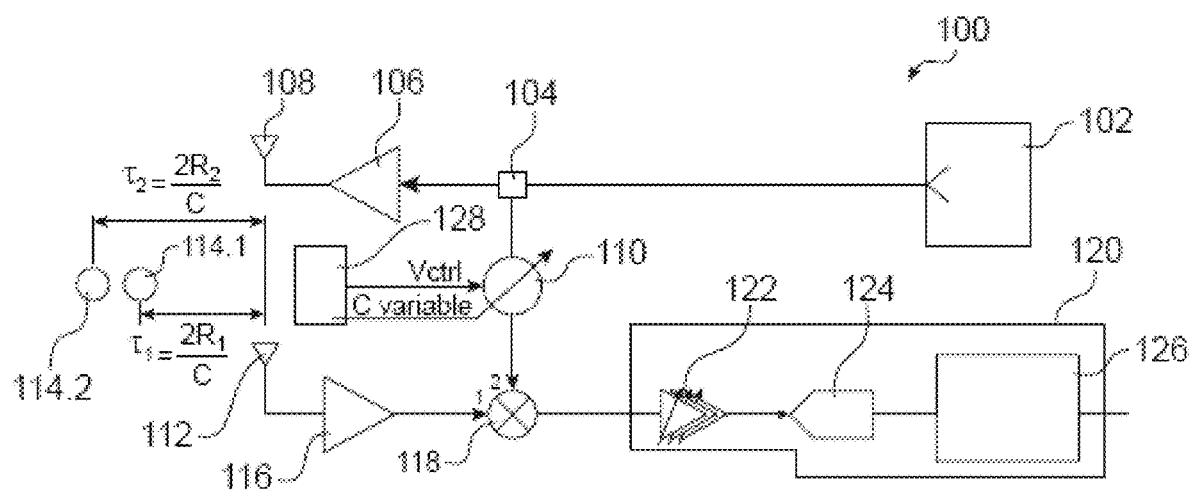
FIG. 1 schematically shows a radar measuring device according to a first embodiment.

In the example of FIG. 1, two reflectors 114.1 and 114.2 are shown, the reflector 114.1 being closer to the receiving antenna 112 than the reflector 114.2. The delay $\tau_1$ imparted on the radar signal reflected on the first reflector 114.1 is such that $$\tau_1 = \frac{2R_1}{c},$$

with $R_1$ corresponding to the distance between the first reflector 114.1 and the receiving antenna 112, and c corresponding to the velocity of light in vacuum. The delay $\tau_2$ imparted on the radar signal reflected on the second reflector 114.2 is such that $$\tau_2 = \frac{2R_2}{c},$$

with $R_2$ corresponding to the distance between the second reflector 114.2 and the receiving antenna 112. In the case shown in FIG. 1, the distances $R_1$ and $R_2$ are such that $R_2 > R_1$, and therefore the delays $\tau_1$ and $\tau_2$ are such that $\tau_2 > \tau_1$.

The signal $RF_{IN\_REFL}(t)$ is sent at the input of a low-noise amplifier 116 whose output is coupled to a first input of a mixer 118. A second input of the mixer 118 is coupled to an output of the ILO 110. And output of the mixer 118 is coupled to an input of a signal processing circuit 120.

In the embodiment of FIG. 1, the signal processing circuit 120 includes a filtering circuit 122 performing a band-pass filtering of the signal delivered at the output of the mixer 118. According to one embodiment, the filtering circuit 122 includes several stages with a gain higher than 1 coupled in series and performing together this band-pass filtering. The output of the filtering circuit 122 is coupled to an input of an analog-to-digital converter 124.

The output of the converter 124 is coupled to the input of a circuit 126 configured to perform a processing of the signal obtained after the implementation of the analog-to-digital conversion in order to keep only portions of this signal during which the ILO 110 is locked over a portion of the effective band B. When the signal $RF_{IN\_REFL}(t)$ received by the receiving antenna 112 is mixed with the signal obtained at the output of the ILO 110, a convolution of the spectra of these two signals takes place. Depending on the considered frequency band, the result of this convolution is:

in the band between 0 and $f_{in}$, the result of the selection of the unique band B derived from the ILO 110;

in the band between $f_{in}$ and +∞, the convolution of the signal delivered at the output of the ILO 110 with other ramps in other bands.

The frequency $f_{in}$ corresponds to the maximum frequency deviation between the emitted and received signals, for a given radar range $D_{max}$, i.e. $f_{in} = \alpha \cdot T_{max} = \alpha \cdot D_{max}/c$, with $T_{max}$ the maximum value of T.

Then, this portion lying in the band between $f_{in}$ and +∞, is filtered by an analog filter of the circuit 126 and only the useful portion of the spectrum in the acquisition band is kept.

This circuit 126 also performs a phase equalisation, or compensation, and a discrete Fourier transform, for example in the form of an FFT, of the processed signal. The phase equalisation is performed by determining the power profile of the phase-shift of the processed signal according to the frequency and by applying the inverse of this profile to the signal. The circuit 126 also performs an amplitude equalisation allowing compensating for the deformation of the amplitude of the signal due to the shape of the spectrum of the envelope signal.

In this first embodiment, for the ILO 110 to be locked over several portions of the effective band B (which is wider than the locking band of the ILO 110), the device 100 includes a control circuit 128 configured to modify, at each period T of the radar signal $RF_{IN}(t)$, the locking frequency band of the ILO 110 such that, over several successive periods of the radar signal $RF_{IN}(t)$, the locking frequency bands of the ILO 110 include, together, the effective band B. To modify the locking frequency band of the ILO 110, the control circuit 128 is configured to apply, on a control input of the ILO 110, a control voltage, called Vctrl, whose value determines the central frequency $f_c$ of the locking frequency band of the ILO 110. Alternatively to or complementarily with the variation of the control voltage Vctrl, the control circuit 128 could be configured to modify the values of switched capacitances, forming together a capacitance with a value C, of a resonator for example an LC-type one, of the ILO 110. For example, the natural oscillation frequency of the ILO 110 can thus be modified in a range that could extend to substantially 30% with respect to its nominal carrier frequency.

Figure 10:
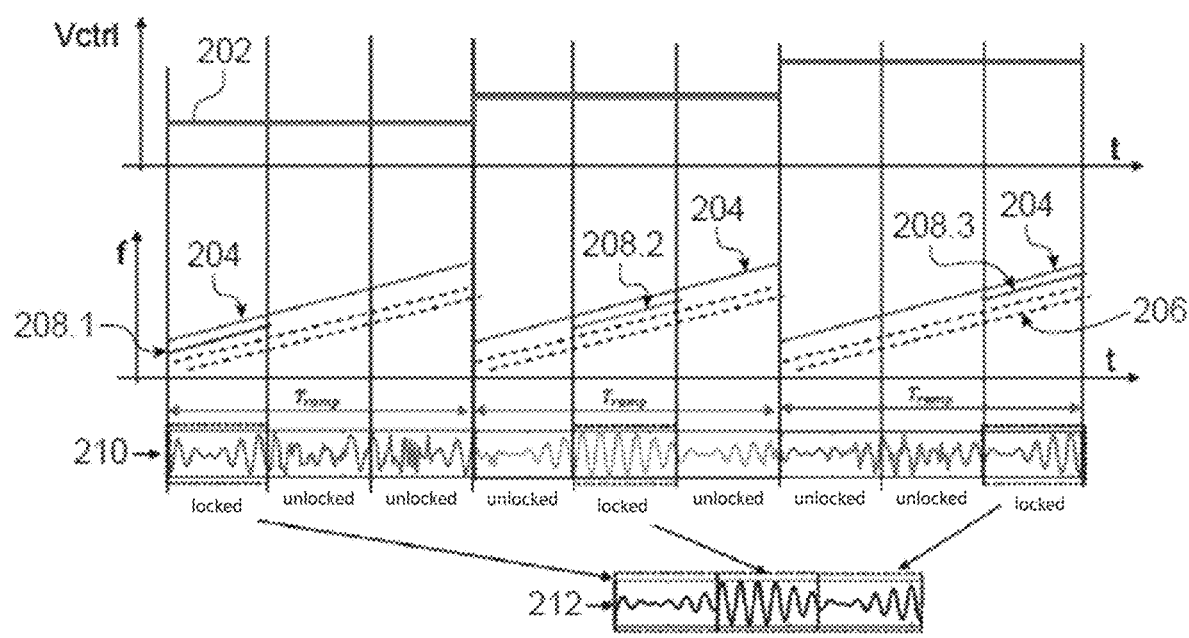
FIG. 10 shows several signals of the radar measuring device according to the first embodiment.

This operation of the device 100 according to the first embodiment and illustrated by FIG. 10 which illustrates several signals of the device 100. The signal $V_{ctrl}$, bearing the reference 202, corresponds to the control voltage applied on the ILO 110 and whose value makes the locking frequency band of the ILO 110 vary. The evolution in the time domain of the instantaneous frequency of the radar signal $RF_{IN}(t)$ is also shown in FIG. 10 and is designated by the reference 204. The reference 206 designates echo signals of the signal $RF_{IN}(t)$ which are represented in dotted lines. The references 208.1, 208.2 and 208.3 designate the evolution in the time domain of the instantaneous frequency of the signal delivered at the output of the ILO 110 when the latter is locked on the radar signal $RF_{IN}(t)$ on different locking frequency bands. The variation of the locking band of the ILO 110 is obtained via the parameters (value of the control voltage Vctrl and/or values of switched capacitances) applied by the control circuit 128 on the ILO 110. The reference 210 designates the signal obtained at the output of the filtering circuit 122. The signal designated by the reference 212 corresponds to the signal obtained after the processing applied by the circuit 126 and which is formed by the portions of the signal 210 obtained when the ILO 110 is locked over different portions of the effective band B.

Figure 11:
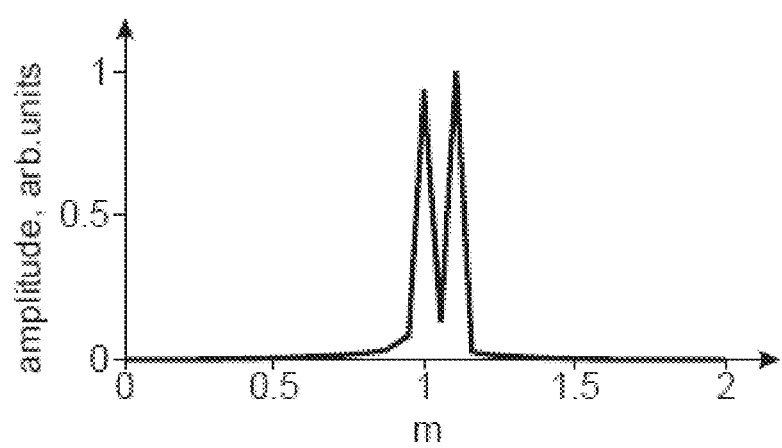
FIG. 11 shows an example of a signal obtained at the output of the signal processing circuit of the radar measuring device.

FIG. 11 shows the signal obtained after the discrete Fourier transform applied by the circuit 126, and which corresponds to the signal delivered at the output of the signal processing circuit 120. The measurement of the two reflectors 114.1, 114.2 on which the signal $RF_{IN}(t)$ is reflected is clearly visible thanks to the two peaks obtained on this signal and whose value on the abscissa axis corresponds to the distance of each of the reflectors 114.1, 114.2 with respect to the receiving antenna 112 of the device 100.

Since the radar signal $RF_{IN}(t)$ has its frequency that varies over time, this frequency variation induces phase-shift conditions that are also variable over time. This evolution of the phase-shift in the locking band of the ILO 110 is therefore characterised to perform the post-calibration of this subsequent phase-calibration of the measurement of the radar signal. For this purpose, the device 100 may include a controllable feedback circuit (not shown in FIG. 1) configured, in a configuration of measuring the phase-shift between the radar signal $RF_{IN}(t)$ and the signal delivered at the output of the ILO 110, to directly connect the first output of the power divider 104 to the first input of the mixer 118. In this phase-shift measurement configuration, the signal processing circuit 120 performs a measurement of the phase-shift between the radar signal $RF_{IN}(t)$ and the signal delivered at the output of the ILO 110, then, during an operation of the device 100 in a radar measurement configuration where the feedback circuit does not connect the first output of the power divider 104 to the first input of the mixer 118, a compensation of the phase-shift between the radar signal $RF_{IN}(t)$ and the signal delivered at the output of the ILO 110 using the phase-shift measurement performed beforehand. Alternatively, it is possible that the device 100 does not include such a feedback circuit and the phase-shift between the radar signal $RF_{IN}(t)$ and the signal delivered at the output of the ILO 110 is measured in a low-frequency portion of the signal applied at the input of the signal processing circuit 120 and which corresponds to a leakage due to the coupling between the emission portion of the radar signal $RF_{IN}(t)$ and the reception portion of the reflected radar signal $RF_{IN\_REFL}(t)$ of the device 100.

In this first embodiment, the locking frequency band of the ILO 110 is dynamically modified thanks to the modification of the value of the control voltage Vctrl and/or of the variable capacitance C of the resonator of the ILO 110 over several periods T of the signal $RF_{IN}(t)$. Hence, this first embodiment enables the device 100 to operate over a wide effective band B, yet with some duration of acquisition of the reflected radar signal $RF_{IN\_REFL}(t)$ to cover the entire effective band B because the device 100 includes only one single ILO 110 to scan this effective band B.

In this first embodiment, it is possible to perform a relative change of the carrier frequency $\Delta f$ of the ILO 110 up to $\Delta f/fc=5\%$, with fc corresponding to the central frequency of the effective band B, and thus scan the entire effective band B by locking the ILO 110 on several portions of the effective band B. Thus, considering a locking frequency band of the ILO 110 centred around the frequency 1.2 GHz, the device 110 is capable of acquiring a radar signal over a relative frequency band that exceeds 5% of the effective band B. For example, with an ILO 110 that could be locked over a frequency band of 1.2 GHz, and with a radar signal $RF_{IN}(t)$ with an effective band B equal to 3.6 GHz ranging from 59.4 GHz to 63 GHz, the ILO 110 will be controlled so as to be locked over three different locking frequency bands with three offsets of its carrier frequency with the frequencies $f_c$ equal to 60 GHZ, 61.2 GHz and 62.4 GHz, and thus cover the entire effective band B with this single ILO 110. In this case, the device 100 forms a radar receiver with a relative band equal to 6%.

With this first embodiment, while considering that the radar signal $RF_{IN}(t)$ generated by the circuit 102 corresponds to a signal with a train of pulses coherently modulated, with or without a spectral overlap, having a central frequency $f_c$ equal to 60 GHz, that the ILO 110 could be locked over a frequency band lower than or equal to 1.2 GHz and that the ILO 110 is controlled to be locked over four different locking frequency bands by offsetting its carrier frequency, the spatial resolution $\Delta R$ that could be obtained is larger than 3.6 cm, and the acquisition duration is in the range of 1 µs. The maximum effective band B that could be obtained with the device 100 according to the first embodiment is 4.2 GHz.

Another advantage of the radar measuring device according to this first embodiment is that its electric consumption is reduced because of the use of one single frequency channel, one single ILO, and one single baseband route of the analog-to-digital converter.

A device 100 according to a second embodiment is described hereinbelow in connection with FIG. 12.

In comparison with the first embodiment, the device 100 according to this second embodiment includes m ILOs 110.1-110.m, with m an integer greater than 1. In FIG. 12, two ILOs bearing the references 110.1 and 110.m are shown.

The device 100 according to this second embodiment also includes m power dividers 104, called first power dividers, configured to apply the radar signal $RF_{IN}(t)$ on the emitting antenna 108 (through the power amplifier in the embodiment of FIG. 12) and on an input of each of the ILOs 110.1-110.*m*. In FIG. 12, two first power dividers 104.1 and 104.*m* are shown.

Figure 12:
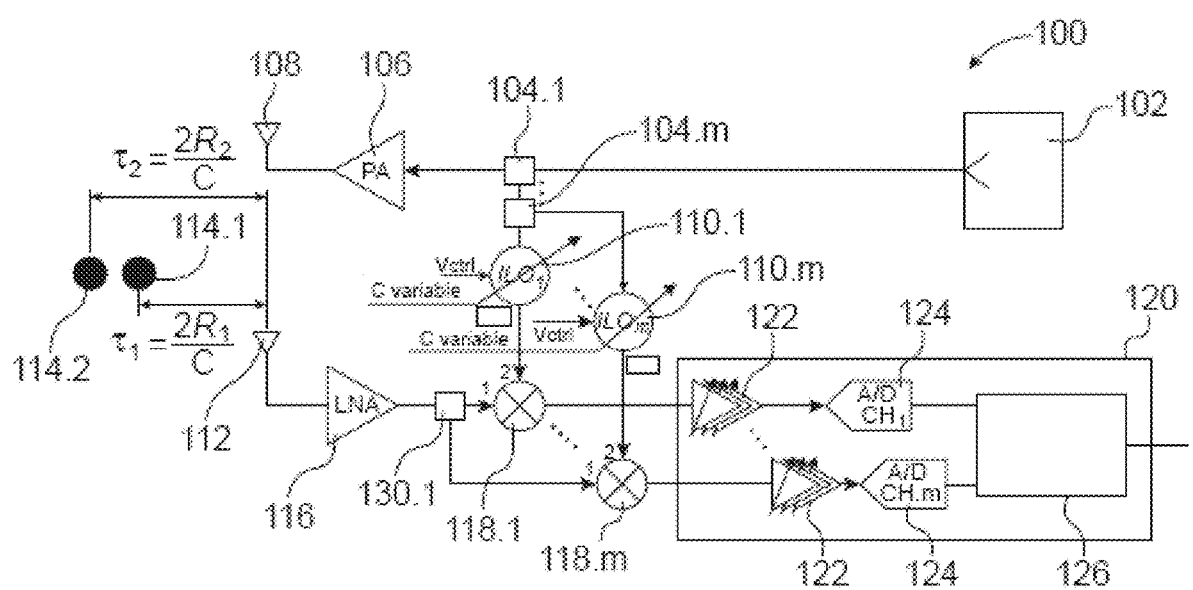
FIG. 12 schematically shows a radar measuring device according to a second embodiment.

In the embodiment shown in FIG. 12, the input of the power divider 104.1 is coupled to the output of the circuit 102, a first output of the power divider 104.1 is coupled to the input of the power amplifier 106 and a second output of the power divider 104.1 is coupled to the input of the power divider 104.*m*. A first output of the power divider 104.*m* is coupled to the input of the ILO 110.1 and a second output of the power divider 104.*m* is coupled to the input of the ILO 110.*m*. Alternatively, the first power dividers 104.1-104.*m* and the ILOs 110.1-110.*m* may be coupled in a manner different from the example shown in FIG. 12.

The device 100 according to the second embodiment also includes several mixers 118.1-118.*m* each comprising a second input coupled to an output of one of the ILOs 110.1-110.*m* and an output coupled to an input of the signal processing circuit 120. This device 100 also includes m−1 second power dividers 130.1-130.(*m*−1) configured to apply the reflected radar signal $RF_{IN\_REFL}(t)$ on a second input of each of the mixers 118.1-118.*m*. In the embodiment shown in FIG. 12, one single second power divider 130.1 is shown, the latter comprising an input coupled to the output of the low-noise amplifier 116, a first output coupled to the first input of the mixer 118.1 and a second output coupled to the first input of the mixer 118.*m*.

In the embodiment shown in FIG. 12, the signal processing circuit 120 includes m inputs each conveying the output signal of one of the mixers 118.1-118.*m* in a filtering circuit 122 and an analog-to-digital converter 124 dedicated to this signal. The outputs of all analog-to-digital converters 124 are coupled to inputs of the circuit 126.

In this second embodiment, the radar signal $RF_{IN}(t)$ is therefore applied at the input of each ILO 110.1-110.*m* in an independent manner. Each of the ILOs 110.1-110.*m* will replicate on its output the emitted radar signal $RF_{IN}(t)$ only in the locking band specific to each of the ILOs 110.1-110.*m* and which is defined by the properties of the resonator of the ILO and of the value of the control voltage applied thereon. Each of the ILOs 110.1-110.*m* therefore filters the radar signal $RF_{IN}(t)$ in its frequency band of interest. Afterwards, after having mixed the output signal of each of the ILOs 110.1-110.*m* with the reflected radar signal $RF_{IN\_REFL}(t)$ and thus frequency transposed the reflected radar signal $RF_{IN\_REFL}(t)$ in the locking frequency band of each ILO, low-frequency signals are obtained from which information on the distance and relative velocity of the reflector(s) opposite the receiving antenna 112 of the radar measuring device 100 are obtained. Thus, considering the reception of several frequency bands by different ILOs allows using a radar signal $RF_{IN}(t)$ whose effective band B is larger while keeping a shorter reception duration than is the case in the first embodiment.

Like in the first embodiment, the radar signal $RF_{IN}(t)$ used in the device 100 according to this second embodiment could correspond to one of the signals described before in connection with FIGS. 2 to 9. When the radar signal $RF_{IN}(t)$ corresponds to the previously-described pulse signal and including a spectral overlap over the duration $T_{rampe}$, it is possible to use each of the ILOs 110.1-110.*m* so as to maximise its locking time over a ramp duration $T_{rampe}$.

In this second embodiment, the circuit 120 may be configured to implement:

a band-pass filtering of each of the signals delivered at the output of the mixers 118.1-118.*m*, then an analog-to-digital conversion of each of the signals obtained after the implementation of the filtering, then a processing of the signals obtained after the implementation of the analog-to-digital conversion, keeping only portions of each of these signals during which each of the injection-locked oscillators is locked over a portion of the effective band B, then a discrete Fourier transform of the signal obtained after the implementation of the previous processing.

The signal obtained at the output of the discrete Fourier transform is representative of the distance between the receiving antenna 112 and the reflector(s) on which the radar signal $RF_{IN}(t)$ has been reflected.

In this second embodiment, each of the ILOs 110.1-110.*m* is configured such that its locking frequency band is different from those of the other ILOs 110.1-110.*m* and that the locking frequency bands of the ILOs 110.1-110.*m* cover, together, the effective band B. Each of the ILOs 110.1-110.*m* is configured to be successively locked over a sub-band of the effective band B. In addition, in this second embodiment, the parameters (values of the control voltage Vctrl and of the switched capacitances of the resonator) of each of the ILOs 110.1-110.*m* are constant, which means that the locking band of each of the ILOs 110.1-110.*m* does not vary and is the same for each period T of the radar signal $RF_{IN}(t)$ (in contrast with the first embodiment wherein the locking band of the ILO 110 is different over several periods T of the radar signal $RF_{IN}(t)$).

Figure 13:
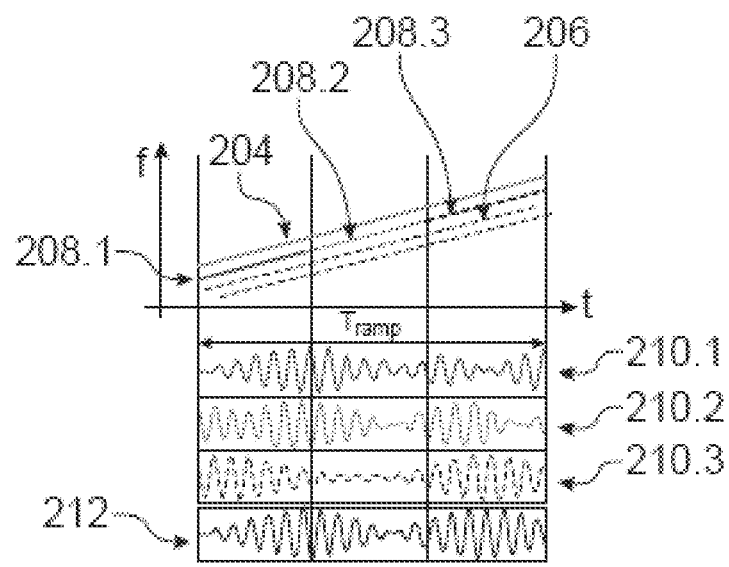
FIG. 13 shows several signals of the radar measuring device according to the second embodiment.

This operation of the device 100 according to the second embodiment is illustrated by FIG. 13 which illustrates several signals of the device 100 when the latter includes three ILOs 110.1-110.3. Like in FIG. 10 described before in connection with the first embodiment, the evolution in the time domain of the instantaneous frequency of the radar signal $RF_{IN}(t)$ is designated by the reference 204. The reference 206 designates echo signals of the signal $RF_{IN}(t)$. Each of the references 208.1, 208.2 and 208.3 respectively designates the evolution in the time domain of the instantaneous frequency of the signal delivered at the output of one of the ILOs 110.1-110.3 when the latter is locked on the radar signal $RF_{IN}(t)$. The references 210.1, 210.2 and 210.3 designate the signals obtained at the output of each of the filtering circuits 122. The signal designated by the reference 212 corresponds to the signal obtained after the preprocessing applied by the circuit 126 and which is formed by the portions of the signals 210.1-210.3 obtained when each of the ILOs 110.1-110.3 is locked over a portion of the effective band B.

In this second embodiment, the value of m, i.e. the number of ILOs, is preferably comprised between 2 and 4, because an excessively large number of power dividers 104.1-104.*m* would lead to applying at the input of the ILOs 110.1-110.*m* signals with an amplitude that is too low for the ILOs 110.1-110.*m* to be able to be locked at the frequency of these signals.

With this second embodiment, considering that the radar signal $RF_{IN}(t)$ generated by the circuit 102 corresponds to a signal with a train of coherently modulated pulses having a central frequency $f_c$ equal to 60 GHz and which does not include any spectral overlap, that each of the ILOs 110.1-110.*m* could be locked over a frequency band lower than or equal to 1.2 GHz and that the device 100 includes at most four ILOs, the spatial resolution ΔR that could be obtained is larger than 12.5 cm, the obtained acquisition duration is in the range of 250 ns and the maximum effective band B that could be obtained is 1.2 GHz. When the radar signal $RF_{IN}(t)$ includes a spectral overlap, the spatial resolution ΔR that could be obtained is larger than 3.1 cm, the obtained acquisition duration is in the range of 1 µs and the maximum effective band B that could be obtained is 4.8 GHz.

Figure 14:
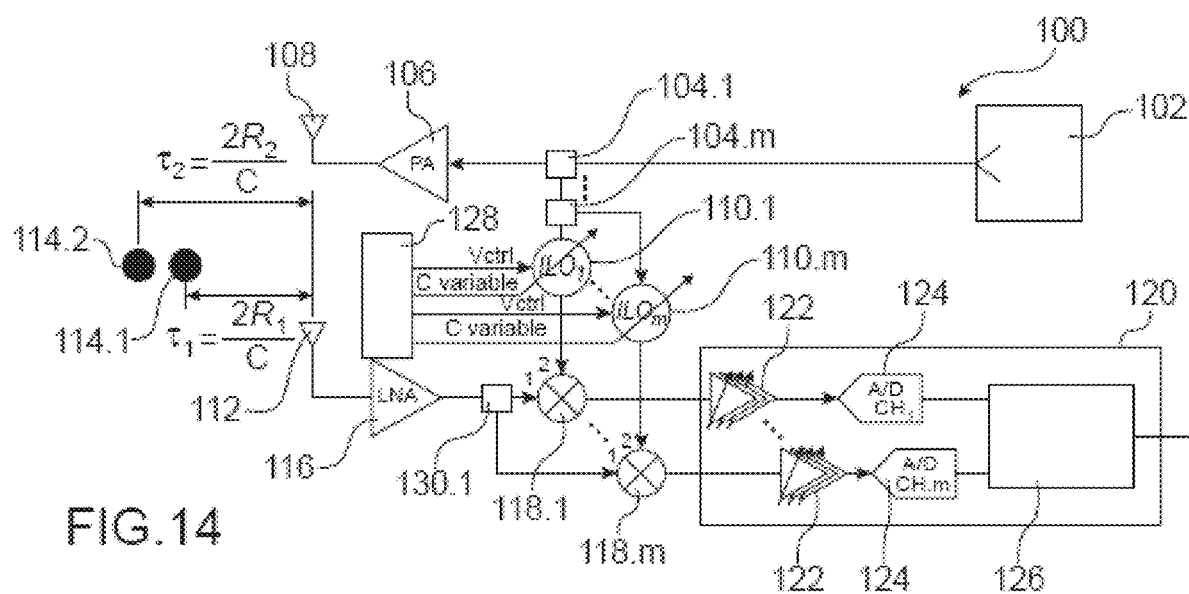
FIG. 14 schematically shows a radar measuring device according to a third embodiment.

A device 100 according to a third embodiment is described hereinbelow in connection with FIG. 14.

This device 100 according to the third embodiment includes all of the elements of the device 100 according to the previously-described second embodiment. The difference between the device 100 according to the third embodiment and that according to the second embodiment is that the parameters (values of the control voltage Vctrl and/or of the switched capacitances of the resonator) of each of the ILOs 110.1-110.m are not constant and are adjusted by the control circuit 128, the locking band of each of the ILOs 110.1-110.m varying over several periods T of the radar signal $RF_{IN}(t)$, like in the first embodiment.

Figure 15:
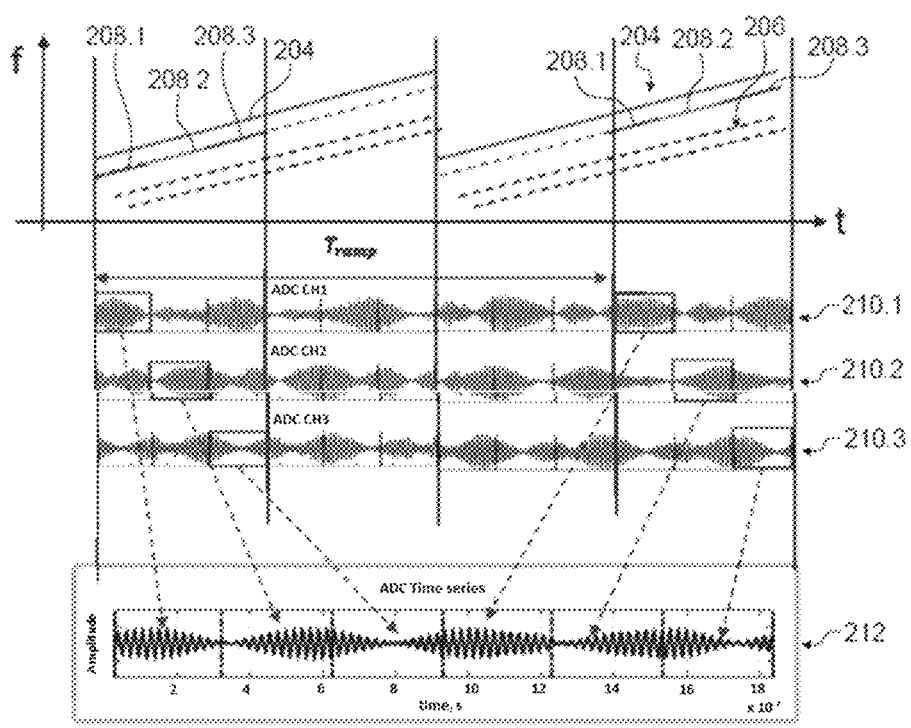
FIG. 15 shows several signals of the radar measuring device according to the third embodiment.

This operation of the device 100 according to the third embodiment is illustrated by FIG. 15 which illustrates several signals of the device 100 when the latter includes three ILOs 110.1-110.3. Like in the previously-described FIGS. 10 and 13, the evolution in the time domain of the instantaneous frequency of the radar signal $RF_{IN}(t)$ is designated by the reference 204. The reference 206 designates echo signals of the signal $RF_{IN}(t)$. Each of the references 208.1, 208.2 and 208.3 respectively designates the evolution in the time domain of the instantaneous frequency of the signal delivered at the output of one of the ILOs 110.1-110.3 when the latter is locked on the radar signal $RF_{IN}(t)$. In the example shown in this FIG. 15, each of the ILOs 110.1-110.3 is locked over a first sub-band of the effective band B during a first period T of the radar signal $RF_{IN}(t)$, and is locked over a second sub-band of the effective band B, different from the first sub-band, during a second period T of the radar signal $RF_{IN}(t)$. Thus, over these two periods of the radar signal $RF_{IN}(t)$, the entirety of the effective band B is covered by the locking sub-bands of the ILOs of the device 100. The references 210.1, 210.2 and 210.3 designate the signals obtained at the output of each of the filtering circuits 122. The signal designated by the reference 212 corresponds to the signal obtained after the preprocessing applied by the circuit 126 and which is formed by the portions of the signals 210.1-210.3 obtained when each of the ILOs 110.1-110.3 is locked over a portion of the effective band B.

Like in the second embodiment, the value of m, i.e. the number of ILOs, of the device 100 according to this third embodiment is preferably comprised between 2 and 4. Furthermore, the number of sub-bands over which each ILO 110 is intended to be locked is comprised for example between 2 and 16.

As example, the device 100 according to this third embodiment allows exploiting a radar signal $RF_{IN}(t)$ whose effective band B will range from 59 GHz to 65 GHz, enabling the radar device 100 to have a resolution equal to 2.5 cm when each of the ILOs 110.1-110.3 covers two distinct sub-bands extending over two distinct periods T of the radar signal $RF_{IN}(t)$. It is possible to cover a larger frequency band by increasing the number of periods over which the locking band of each ILO varies.

With this third embodiment, considering that the radar signal $RF_{IN}(t)$ generated by the circuit 102 corresponds to a signal with a train of coherently-modulated pulses, with or without a spectral overlap, having a central frequency $f_c$ equal to 60 GHz, that each of the ILOs 110.1-110.n could be locked over a frequency band lower than or equal to 1.2 GHz and that the device 100 includes at most four ILOs, the spatial resolution ΔR that could be obtained will be larger than 0.78 cm, and the acquisition duration will be in the range of 4 µs. The maximum effective band B that could be obtained with the device 100 according to the first embodiment is 19.2 GHz.

In all of the previously-described embodiments, it is possible that the ILO(s) of the device 100 is/are used to scan the entire effective band B of the radar signal $RF_{IN}(t)$, or only one portion of this effective band B.

The invention claimed is:

1. A radar measuring device including at least:
   a circuit for generating a radar signal $RF_{IN}(t)$;
   an emitting antenna;
   an injection-locked oscillator;
   a first power divider comprising an input coupled to an output of the circuit for generating the radar signal $RF_{IN}(t)$, a first output coupled to the emitting antenna, and a second output coupled to an input of the injection-locked oscillator which is configured to be locked over a portion of an effective band B of the radar signal $RF_{IN}(t)$;
   a receiving antenna intended to receive a reflected radar signal $RF_{IN\_REFL}(t)$;
   a mixer comprising a first input coupled to the receiving antenna, a second input coupled to an output of the injection-locked oscillator;
   a signal processing circuit an input of which being coupled to an output of the mixer and configured to provide a signal which is representative of a distance between the receiving antenna and at least one reflector onto which the radar signal $RF_{IN}(t)$ is reflected.

2. The radar measuring device according to claim 1, wherein the circuit for generating the radar signal $RF_{IN}(t)$ is configured to generate the radar signal $RF_{IN}(t)$ corresponding to:
   a frequency-modulated periodic signal over at least one portion $T_{rampe}$ of a period T of said signal, corresponding, over said at least one portion $T_{rampe}$ of the period T, to a sinusoidal signal whose frequency varies linearly in the effective band B and whose amplitude alternates between a first value and a second value different from the first value, or
   a train of pulses whose frequency modulation is defined by the time position of the beginning of each pulse, by the relative phase-shift of the signal at the beginning of each pulse and by the width of each pulse.

3. The radar measuring device according to claim 2, wherein the radar signal $RF_{IN}(t)$ corresponding to a pulse train is such that:

$$RF_{IN(t)} = \sum_{n=1}^{n_{max}} \prod \left( \frac{t - t_{start}(n) - \frac{T(n)}{4}}{\frac{T(n)}{2}} \right) \cdot e^{j2\pi f_a(t - t_{start}(n))},$$

$$n \in \{1, \ldots, n_{max}\}$$

with
$f_a$ corresponding to the frequency of the carrier of the radar signal $RF_{IN}(t)$;

$T(n) = t_{start}(n+1) - t_{start}(n)$, and which corresponds to the duration of a $n^{th}$ pulse of the radar signal $RF_{IN}(t)$;

$$t_{start}(n) = \frac{f'_{in} T_{rampe}}{B_{in}} \left( -1 + \sqrt{1 + \frac{2B_{in}}{f'^2_{in} T_{rampe}}(n-1)} \right), n \in \{1, \ldots, n_{max}\},$$

and which corresponds to the starting time of each $n^{th}$ pulse of the radar signal radar $RF_{IN}(t)$;

$f_{in}'$ corresponding to the fundamental frequency of the modulating signal when n=1;

$n_{max}$ corresponding to the number of pulses in the radar signal $RF_{IN}(t)$ over the effective band B.

4. The radar measuring device according to claim 1, further including a control circuit of the injection-locked oscillator configured to modify, at each period of the radar signal $RF_{IN}(t)$, the locking frequency band of the injection-locked oscillator such that, over several successive periods of the radar signal $RF_{IN}(t)$, the locking frequency bands of the injection-locked oscillator cover, together, the effective band B.

5. The radar measuring device according to claim 1, wherein the signal processing circuit is configured to implement:
   a band-pass filtering of the signal delivered at the output of the mixer, then
   an analog-to-digital conversion of the signal obtained after the implementation of the band-pass filtering, then
   a processing of the signal obtained after the implementation of the analog-to-digital conversion, keeping only portions of this signal during which the injection-locked oscillator is locked over a portion of the effective band B, then
   a discrete Fourier transform of the signal obtained after the implementation of the processing keeping only portions of the signal during which the injection-locked oscillator is locked over a portion of the effective band B.

6. The radar measuring device according to claim 1, including:
   several injection-locked oscillators;
   several first power dividers configured to apply the radar signal $RF_{IN}(t)$ on the emitting antenna and on an input of each of the injection-locked oscillators;
   several mixers each comprising a second input coupled to an output of one of the injection-locked oscillators and an output coupled to an input of the signal processing circuit;
   one or several second power divider(s) configured to apply the reflected radar signal $RF_{IN\_REFL}(t)$ on a first input of each of the mixers.

7. The radar measuring device according to claim 6, wherein the signal processing circuit is configured to implement:
   a band-pass filtering of each of the signals delivered at the output of the mixers, then
   an analog-to-digital conversion of each of the signals obtained after the implementation of the filtering, then
   a processing of the signals obtained after the implementation of the analog-to-digital conversion, keeping only portions of each of these signals during which each of the injection-locked oscillators is locked over a portion of the effective band B, then
   a discrete Fourier transform of a signal obtained after the implementation of the processing keeping only portions of each of the signals during which each of the injection-locked oscillators is locked over a portion of the effective band B.

8. The radar measuring device according to claim 6, wherein each of the injection-locked oscillators is configured such that its locking frequency band is different from that of the other injection-locked oscillators and that the locking frequency bands of the injection-locked oscillators cover, together, the effective band B.

9. The radar measuring device according to claim 6, further including a control circuit of each of the injection-locked oscillators configured to modify, at each period of the radar signal $RF_{IN}(t)$, the locking frequency band of each of the injection-locked oscillators such that, over several periods of the radar signal $RF_{IN}(t)$, the locking frequency bands of the injection-locked oscillators include, together, the effective band B.

10. The radar measuring device according to claim 9, wherein the injection-locked oscillators are configured to be successively or simultaneously locked over different portions of the effective band B.

11. The radar measuring device according to claim 4, wherein:
   the control circuit is configured to apply, at the input of the injection-locked oscillator or of each of the injection-locked oscillators, a control voltage whose value determines a central frequency $f_c$ of a locking frequency band of the injection-locked oscillator or of each of the injection-locked oscillators, and/or
   the control circuit is configured to modify the values of switched capacitances of at least one resonator in the injection-locked oscillator or in each of the injection-locked oscillators.

12. The radar measuring device according to claim 9, wherein:
   the control circuit is configured to apply, at the input of the injection-locked oscillator or of each of the injection-locked oscillators, a control voltage whose value determines a central frequency $f_c$ of a locking frequency band of the injection-locked oscillator or of each of the injection-locked oscillators, and/or
   the control circuit is configured to modify the values of switched capacitances of at least one resonator in the injection-locked oscillator or in each of the injection-locked oscillators.

13. The radar measuring device according to claim 1, further including at least one power amplifier disposed between the emitting antenna and the first power divider(s).

14. The radar measuring device according to claim 1, further including at least one low-noise amplifier interposed between the receiving antenna and the mixer or, when the radar measuring device includes several second power dividers, between the receiving antenna and the second power dividers.

15. The radar measuring device according to claim 1, wherein the signal processing circuit (120) is configured to carry out a compensation of a phase-shift between the radar signal $RF_{IN}(t)$ and the signal(s) delivered at the output of the injection-locked oscillator(s).

16. The radar measuring device according to claim 15, further including a controllable feedback circuit configured, in a configuration of measuring the phase-shift between the radar signal $RF_{IN}(t)$ and the signal(s) delivered at the output of the injection-locked oscillator(s), to directly connect the first output of the first power divider of one of the first power dividers to the first input of the mixer or of each of the mixers, and wherein the signal processing signal is configured to perform a measurement of the phase-shift between the radar signal $RF_{IN}(t)$ and the or each of the signals delivered at the output of the injection-locked oscillator(s), then the phase-shift compensation using the performed phase-shift measurement(s).

* * * * *